3,020,265
ACRYLONITRILE POLYMERIZATION PROCESS
Raymond F. Tietz, Wilmington, Del., assignor to E. I. du Pont de Nemours and Company, Wilmington, Del., a corporation of Delaware
No Drawing. Filed Nov. 4, 1957, Ser. No. 694,109
10 Claims. (Cl. 260—79.3)

This invention relates to an improved process of copolymerizing acrylonitrile with other monomers. More specifically, this invention relates to the improved copolymerization of acrylonitrile and acidic monomers.

Yarns from polyacrylonitrile have poor affinity for dyes, and they can be dyed only with difficulty using basic, acid and dispersed acetate-type dyes. Even then, however, such dyeings are not entirely satisfactory. Deep dyeing with basic dyes is particularly desirable in order to facilitate cross- and union-dyeing of yarns formed from acrylonitrile polymer fibers and wool (using acid dyes on wool) and with rayon (using direct dyes on the rayon). One method for providing acrylonitrile polymers with good basic dyeability involves inclusion in the polymer of 40 to 90 milliequivalents of combined sulfur as sulfonic or sulfuric ionizable groups per kilogram of polymer. Such dyeability is shown by a copolymer of acrylonitrile containing from about 0.4 percent to 3 percent of a polymerizable sulfonic acid or its salt.

Copolymers of acrylonitrile and such monomers as allylsulfonic acid and methallylsulfonic acid are known but their preparation is wasteful and expensive. In conventional aqueous polymerizations, the monomer mixture must contain at least 5 percent of such an acidic monomer to obtain a copolymer containing 2.0 percent of the sulfonated monomer. Thus, the "relative utilization" of the sulfonic acid (SA) in the polymerization reaction is only about 0.4 or lower (SA in copolymer/SA in total monomer feed=0.4).

Such poor "relative utilizations" of these acidic monomers have heretofore precluded their commercial use in copolymers of acrylonitrile, since these materials are expensive and their commercial use would require costly apparatus for recovery purposes. Also, the very low relative utilization of an acidic monomer in comparison with the comonomers renders the copolymer composition very sensitive to the over-all conversion and involves expensive and difficult control measures to produce a uniform copolymer.

It is an object of this invention to provide a process for the improved utilization of polymerizable unsaturated sulfonic acids and their salts in copolymerization reactions of monomer mixtures containing at least 85% acrylonitrile.

The objectives of this invention are attained by copolymerizing with free radical type initiators a mixture of addition polymerizable monomers comprising an ethylenically unsaturated sulfonic acid or its salt in an amount equal to 0.1 to 3% of the total polymerization mixture, acrylonitrile in an amount equal to at least 85% of the total monomer weight and other ethylenically unsaturated monomers as desired in a liquid diluent, the dielectric constant of the polymerization system when measured at a temperature of 29° C. being 60 or lower.

The following examples illustrate the advantages of the invention. All parts and percentages are by weight unless otherwise indicated.

EXAMPLE I

Batch copolymerizations of acrylonitrile (40% of entire system) and sodium allylsulfonate are carried out in 500 ml. 3-necked flasks fitted with a reflux condenser, a stirrer, and a nitrogen inlet to maintain the polymerization under an inert atmosphere. An amount of $\alpha,\alpha'$-azobisisobutyronitrile in an amount equivalent to 0.2% of the total monomer weight in the polymerization is used as a polymerization initiator. The reaction medium and quantity of sodium allylsulfonate are varied, as shown in Table I. The flasks are immersed in a 65° C. constant temperature bath; polymerization is allowed to proceed until a sufficient amount of polymer has been formed for analytical purposes. The polymerization reaction product mixture is quenched by pouring the contents of the flask into about 500 ml. of water and stirring in a Waring Blendor. After being filtered, the polymer is twice resuspended in water and filtered. The wet polymer is washed once with methanol and then dried in a 50–60° C. vacuum oven.

The dielectric constant (designated D in Table I) of the polymerization system (40% acrylonitrile) is measured using standard techniques at 29° C. The term "relative utilization" represents the weight of the combined sodium allylsulfonate in the copolymer formed divided by the sodium allylsulfonate present in the initial monomer mixture, expressed as percent.

Table I

| Run | Polymerization Media | Dielectric Constant [1] | Sodium Allyl Sulfonate | | Polymer | | Relative Utilization | Yield, Percent | $(n)_k$ |
|---|---|---|---|---|---|---|---|---|---|
| | | | Percent of Feed | Percent of Monomer | Percent SAS [5] | Acidity [2] | | | |
| 1 | water | 79 | 0.13 | 0.32 | 0.026 | 1.8 | 0.08 | 3.4 | 4.3 |
| 2 | do | | 0.25 | 0.63 | 0.043 | 3.0 | 0.07 | 4.4 | 4.9 |
| 3 | do | | 0.97 | 2.44 | 0.174 | 12 | 0.07 | 4.3 | 5.1 |
| 4 | do | | 2.0 | 5.06 | 0.39 | 27 | 0.08 | 5.0 | 5.4 |
| 5 | DMF [3]/water 80/20 | 46 | 0.12 | 0.30 | 0.58 | 40 | 1.93 | 7.4 | 2.0 |
| 6 | do | | 0.24 | 0.60 | 0.84 | 58 | 1.40 | 8.0 | 1.9 |
| 7 | do | | 0.48 | 1.21 | 1.36 | 94 | 1.14 | 5.9 | 1.9 |
| 8 | do | | 0.97 | 2.43 | 2.15 | 150 | 0.88 | 7.8 | 1.8 |
| 9 | do | | 1.93 | 4.85 | 3.63 | 252 | 0.67 | 3.0 | 1.5 |
| 10 | DMF/water 70/30 | 49.0 | 0.25 | 0.63 | 0.7 | 49 | 1.11 | 8.2 | 2.4 |
| 11 | DMF/water 50/50 | 54.8 | 0.26 | 0.65 | 0.53 | 37 | 0.81 | 8.4 | 3.3 |
| 12 | Butyrolactone/water 80/20 | 59 | 0.25 | 0.63 | 0.59 | 41 | 0.94 | 6.3 | 2.9 |
| 13 | Dimethylsulfoxide/water 70/30 | | 0.25 | 0.63 | 0.60 | 42 | 0.97 | 28.1 | 5.3 |
| 14 | Dimethylacetamide/water 80/20 | 46 | 0.25 | 0.63 | 1.02 | 71 | 1.63 | 11.2 | 1.9 |
| 15 | TMS [4]/water 80/20 | 49 | 0.25 | 0.63 | 0.56 | 39 | 0.89 | 7.5 | 4.6 |
| 16 | Ethylene Carbonate/water 90/10 | | 0.25 | 0.63 | 0.49 | 34 | 0.76 | 9.9 | 2.8 |
| 17 | Methyl Ethyl Ketone/water 80/20 | 25 (@ 60° C.) | 0.25 | 0.63 | 0.48 | 33 | 0.76 | 4.2 | 1.9 |

[1] Dielectric constant of polymerization system.
[2] Milliequivalents per kilogram.
[3] Dimethylformamide.
[4] Tetramethylenesulfone.
[5] Sodium allyl sulfonate.

Runs 1 to 4 show the very low "relative utilization" obtained when prior art procedures are followed and the polymerization is carried out in an aqueous system having a relatively high dielectric constant. Runs 2, 6, and 10–17 may be compared, since all used a similar acidic monomer concentration. Run 2 (water as a medium) has a "relative utilization" of 0.07, while the other runs all have a "relative utilization" that is from 10 to 20 times greater.

Similar results are obtained when the triethylammonium salt of allylsulfonic acid is used in place of the sodium allylsulfonate above.

EXAMPLE II

The copolymerization procedure of Example I is followed with the replacement of the sodium allylsulfonate with potassium ethylenesulfonate. The results are shown in Table II. Molecular weights of the polymers formed as measured by inherent viscosity $[n]_h$ are similar to those of Example I.

Table II

| Run | Polymerization Media | Dielectric Constant[3] | Acidic Monomer | |
|---|---|---|---|---|
| | | | Percent of other Monomers | Relative Utilization |
| 18 | DMF/H₂O | 90/10 | 41.9 | 0.31 | 2.1 |
| 19 | DMF/H₂O | 90/10 | 41.9 | 0.61 | 1.6 |
| 20 | DMF/H₂O | 90/10 | 41.9 | 1.22 | 1.3 |
| 21 | DMF/H₂O | 90/10 | 41.9 | 2.45 | 1.1 |
| 22 | DMF/H₂O | 60/40 | 52.3 | 0.61 | 0.9 |
| 23 | DMF/H₂O | 30/70 | | 0.61 | 0.4 |
| 24 | BL[1]/H₂O | 80/20 | 59.2 | 0.61 | 0.8 |
| 25 | TMS[2]/H₂O | 80/20 | 49.0 | 0.61 | 0.7 |

[1] Butyrolactone.
[2] Tetramethylenesulfone.
[3] Of polymerization system.

Similar results are obtained when the sodium salt of ethylenesulfonic acid is used in place of the potassium salt.

EXAMPLE III

Copolymerization of acrylonitrile and methallylsulfonic acid is effected by the technique of Example I. The results with varying polymerization media are shown in Table III. In run 28, the sodium salt of the free acid is used. A similar high "relative utilization" as compared with run 27 is seen. This monomer gives higher "relative utilization" values than other acid monomers, but the improvement with a system of low dielectric constant in apparent.

Table III

| Run | Polymerization Media | Dielectric Constant[1] | Acidic Monomer | |
|---|---|---|---|---|
| | | | Percent of other Monomers | Relative Utilization |
| 26 | DMF/H₂O | 90/10 | 41.9 | 0.49 | 4.2 |
| 27 | DMF/H₂O | 50/50 | 54.8 | 0.49 | 1.7 |
| 28 | DMF/H₂O | 80/20 | 46.4 | 0.30 | 4.2 |
| 29 | DMF/benzene | 30/70 | 19.4 | 0.49 | 8.0 |

[1] Of polymerization system.

Similar results are obtained when acrylonitrile is replaced with a 94/6 mixture of acrylonitrile and methyl acrylate.

The substitution of sodium methallyldisulfonate (sodium-2-methyl propene 1,3-disulfonate) for methallylsulfonic acid gives similar results.

EXAMPLE IV

Copolymers of acrylonitrile and allylsulfonic acid are prepared using the technique of Example I with several polymerization media as shown in Table IV. The dependency of "relative utilization" at a given level of acidic monomer present in the total monomer mixture upon the dielectric constant of the polymerization system is clearly shown.

Table IV

| Run | Polymerization Media | | Dielectric Constant[2] | Acidic Monomer | |
|---|---|---|---|---|---|
| | | | | Percent of other Monomers | Relative Utilization |
| 30 | DMF | | [1] 39 | 0.25 | 2.6 |
| 31 | DMF | | [1] 39 | 0.49 | 2.0 |
| 32 | DMF/H₂O | 80/20 | 46.4 | 0.27 | 1.9 |
| 33 | DMF/H₂O | 50/50 | 54.8 | 0.27 | 1.0 |
| 34 | DMF/H₂O | 30/70 | | 0.25 | 0.7 |
| 35 | DMF/C₆H₆ | 30/70 | 19.4 | 0.41 | 3.7 |
| 36 | DMF/Methyl Ethyl Ketone | 30/70 | 26.4 | 0.41 | 3.4 |

[1] For DMF alone.
[2] Of polymerization system.

EXAMPLE V

Although this invention has been illustrated by means of batch polymerizations in order to more clearly show the advance made, it has its greatest utility in the realm of continuous polymerization reactions, as shown in this example. A mixture of monomers (acrylonitrile/methyl acrylate (93/7)) in the amount of 55 parts is added continuously, along with 45 parts dimethylformamide/water (85/15); triethylammonium ethylenesulfonate in the amount of 0.45% based on the other monomers (and calculated as the acid); benzoyl peroxide in the amount of 0.20% based on monomers; triethylamine in the amount of 0.07% based on monomers; sulfur dioxide in the amount of 0.13% based on monomers; and ferrous ion in the amount of 10 p.p.m. based on monomers; through appropriate metering devices to a water-jacketed, stirred aluminum reactor under a blanket of nitrogen gas at such a rate that the contents of the reactor are completely replaced every 100 minutes. The temperature is maintained at 55° C. and the slurry containing polymer and unreacted monomer and diluent is continuously caught and shortstopped against further polymerization by the addition of 0.06% thiourea based on the monomers and 0.20% triethylamine based on the monomers. Timed samples of the polymer slurry are collected, the polymer completely precipitated, washed and dried. Conversion of monomers to copolymer is 49% and inherent viscosity of the copolymer is 1.3. The resulting copolymer contains 0.49% ethylenesulfonic acid units after corrections are made for acidic end groups derived from the sulfur dioxide. Thus, a "relative utilization" of 1.1 with the sulfonated monomer is obtained.

The copolymer is converted into a solution suitable for spinning by evaporation of excess unreacted monomers and removal of water under a vacuum of 100 mm. mercury pressure (absolute) until a solution of 25–30% solids has been formed. This solution is extruded at 100° C. through a spinneret containing 5 orifices, each 0.0065 inch in diameter, into an inert gas at 190° C. and the resulting filaments wound up at 100 yards per minute. After extracting the residual dimethylformamide with water at 100° C., the yarn is drawn to 4 times its original length in 95° C. water. The resulting strong yarn has an excellent white color and can be dyed to deep fast shades with basic dyes such as Brilliant Green (color index 662) and Crystal Violet (color index 681).

Similar results are observed in continuous polymerization reactions with sulfonated monomers illustrated in the other examples.

The expression "inherent viscosity," $[n]_h$, as used in the examples, is defined as $$\frac{\ln Nr}{c}$$

wherein $c$ is the concentration of the polymer in 100 ml. of the solvent and $Nr$ is the symbol for relative viscosity (the ratio of the flow time of the polymer solution relative to the flow time of the solvent). The viscosity measurements are made on ½% solutions of the polymer in dimethylformamide (DMF) at 30° C.

By the expression "polymerization system" is meant the mixture of monomers other than the sulfonic acid compound, solvent for the polymer and/or a liquid diluent that is a non-solvent for the polymer.

The acidity of the polymer is determined by percolating a dimethylformamide solution of the polymer through an ion exchange column containing a mixture of a strongly acidic resin and a strongly basic resin followed by passage through a column containing the acidic resin alone. The free acid groups in the polymer solution were then titrated using an alcoholic solution of KOH and a suitable indicator. The polymer concentration was determined by evaporating a portion of the solution to dryness. Analytical results were expressed as milliequivalents of acidic groups per kilogram of dry polymer.

The process of this invention has been illustrated with the copolymerization of acrylonitrile with monomers containing sulfonate groups and with a third monomer, methyl acrylate. In addition to acrylonitrile and unsaturated sulfonic acids or their salts, other monomers copolymerizable with acrylonitrile as disclosed in U.S. 2,456,360 to Arnold and U.S. 2,436,926 to Jacobson can be used as the third or fourth monomer present in amounts up to about 14% of the total monomer concentration. Best results in terms of fiber physical properties are obtained when the acrylonitrile content is kept above 90% with no more than about 9% of all other monomers being used.

In addition to allylsulfonic acid, methallylsulfonic acid, ethylenesulfonic acid and methallyldisulfonic acid and their salts, other ethylenically unsaturated sulfonic acids such as those disclosed in U.S. 2,601,256 to Bruson and U.S. 2,527,300 to Dudley may be used. These sulfonated monomers may be used in the acid form but are preferably used in the form of their salts, such as the ammonium, substituted ammonium (e.g., triethyl ammonium), and metal salts (e.g., sodium, potassium, lithium, zinc, magnesium, calcium, etc.).

The sulfonated monomers of this invention are used in amounts from 0.1% to 3.0% of the total polymerization mixture and preferably from 0.2% to 2.0% depending on their molecular weight and the number of sulfonate groups they contain. Higher concentrations drastically reduce the relative utilization of these monomers.

The liquid media or diluent for the polymerizations of this invention may be any inorganic or organic liquid having a dielectric constant of 60 or less. Preferably, such media which may consist of a single compound or a mixture should be chemically inactive towards all the components of the polymerization mixture. A preferred composition utilizes a solvent for the polymer in the pure form or diluted with other substances, such as water, benzene, methyl ethyl ketone, to name a few. The use of a solvent for the polymer formed is of special advantage in that spinning or casting solutions can be made directly from the polymerization products without the tedious and costly requirement of isolating the polymer, washing, drying, and forming solutions for subsequent casting or extruding of filaments. In addition to the polymer solvents used in the examples, dimethylformamide, dimethylacetamide, dimethylsulfoxide, cyclic tetramethylenesulfone, butyrolactone, and cyclic ethylene carbonate, the extension of this invention to other suitable solvents may be made. Dimethylformamide and dimethylacetamide, diluted or undiluted, afford surprisingly superior "relative utilization" of the acidic monomers and are preferred solvents in the process of this invention.

Any suitable acrylonitrile polymerization initiation system can be used. These are well known in the art. Diaroyl peroxides, diacyl peroxides, organic azo compounds as disclosed in U.S. Patent 2,471,959, perdisulfuric acid and its salts, hydrogen peroxide, and acyl and aroyl peracids are especially suitable.

Peroxides of the structure RCO—OO—COCR where R is alkyl or aroyl (ie., diacyl or diaroyl peroxides) are especially suitable for use in the process of this invention. They may be thermally decomposed, but, for sake of the easier control (being less temperature sensitive) and better color in the polymer, a redox system is preferred. The redox combinations of such a peroxide with $SO_2$ and an oxidizable heavy metal ion, such as $Fe^{++}$ or an N,N'-dialkyl aniline are especially useful.

A preferred polymerization system uses from 24½ to 75% by weight of all monomers (more preferably 40 to 75%), 17.5 to 70% of a solvent for the polymer and from 0 to 20% of a non-solvent for the polymer as a diluent in a continuous polymerization.

This invention permits the use of monomers in making copolymers of acrylonitrile containing sulfonic acid groups that have hitherto been impractical or too costly due to the low relative utilization of such monomers. The copolymers containing such sulfonic acid groups are especially useful in that strong fibers and films which are readily dyed with basic dyes to deep fast colors can be prepared.

The claimed invention:

1. In a process for preparing a polymer of acrylonitrile which comprises polymerizing a monomer mixture containing at least 85% by weight acrylonitrile based on the weight of total monomers and up to about 14% by weight of an ethylenically unsaturated monomer copolymerizable with acrylonitrile based on the weight of total monomers, and between about 0.1% and about 3.0% of a monoethylenically unsaturated sulfonic acid based on the weight of the total polymerization reaction mixture in a liquid medium, the improvement which comprises carrying out said process in the presence of a liquid medium selected from the group consisting of a mixture of an organic solvent for said polymer selected from the group consisting of dimethylformamide, dimethylacetamide, dimethylsulfoxide, tetramethylene sulfone, butyrolactone, and ethylene carbonate and a diluent which is a non-solvent for said polymer selected from the group consisting of water, benzene and methyl ethyl ketone, said mixture being so selected that the polymerization system has a dielectric constant of less than about 60 when measured at a temperature of 29° C.

2. The process of claim 1 in which the sulfonic acid is in the form of an alkali-metal salt.

3. The process of claim 2 in which the alkali-metal salt is sodium.

4. The process of claim 1 in which the liquid medium is a mixture of water and dimethylformamide.

5. The process of claim 4 in which the ratio of water to dimethylformamide is between about 40:60 and about 1:99.

6. The process of claim 1 in which the liquid medium is a mixture of water and dimethylacetamide.

7. The process of claim 1 wherein said process is a continuous process.

8. The process of claim 1 wherein said monomer mixture is present in an amount from about 24.5% to 75% by weight of said polymerization reaction mixture, said solvent is present in an amount from about 17.5% to 70% by weight of said polymerization reaction mixture, and said diluent is present in an amount up to 20% by weight of said polymerization reaction mixture.

9. The process of claim 8 wherein said monomer mixture is present in an amount from about 40% to 75% by weight of said polymerization reaction mixture.

10. The process of claim 8 wherein said process is a continuous process.

References Cited in the file of this patent

UNITED STATES PATENTS 2,601,256 Bruson _____ June 24, 1952
2,796,414 Lowther et al. _____ June 18, 1957
2,900,370 Wilkinson _____ Aug. 18, 1959

OTHER REFERENCES

Handbook of Chemistry and Physics, 38th ed., pp. 2329–2331, Chemical Rubber Publishing Co., Cleveland, Ohio (1956).